United States Patent
Mak et al.

(10) Patent No.: US 12,387,027 B2
(45) Date of Patent: Aug. 12, 2025

(54) METHOD, NON-TRANSITORY COMPUTER-READABLE MEDIUM, AND APPARATUS FOR ARRANGING ELECTRICAL COMPONENTS WITHIN A SEMICONDUCTOR DEVICE

(71) Applicant: TAIWAN SEMICONDUCTOR MANUFACTURING COMPANY LTD., Hsinchu (TW)

(72) Inventors: Wai-Kei Mak, Hsinchu (TW); Ting-Chi Wang, Hsinchu (TW); Tsu-Ling Hsiung, New Taipei (TW); Hsuan-Han Liang, Kaohsiung (TW); Sheng-Hsiung Chen, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 769 days.

(21) Appl. No.: 17/729,518

(22) Filed: Apr. 26, 2022

(65) Prior Publication Data
US 2023/0342532 A1    Oct. 26, 2023

(51) Int. Cl.
*G06F 30/392* (2020.01)
*G06F 30/394* (2020.01)

(52) U.S. Cl.
CPC .......... *G06F 30/392* (2020.01); *G06F 30/394* (2020.01)

(58) Field of Classification Search
USPC ......................................................... 716/119
See application file for complete search history.

(56) References Cited

U.S. PATENT DOCUMENTS
2023/0342532 A1* 10/2023 Mak ...................... G06F 30/396

FOREIGN PATENT DOCUMENTS
CN            108073754 A  * 10/2023  ............... G03F 1/36

* cited by examiner

*Primary Examiner* — Mohammed Alam
(74) *Attorney, Agent, or Firm* — WPAT LAW; Anthony King

(57) ABSTRACT

The present disclosure provides a method and an apparatus for arranging electrical components within a semiconductor device, and a non-transitory computer-readable medium. The method includes (a) placing a plurality of cells in a first layout, wherein the first layout includes a first row and a second row adjacent to the first row; (b) dividing the first layout into a plurality of regions; (c) calculating a first density of each of the plurality of regions; (d) calculating, for a first region of the plurality of regions, a first probability of altering cell versions for cells in the first region according to the first density of the first region; (e) altering cell versions of one or more cells in the first region according to a comparison between the first probability and a first threshold; and (f) rearranging the cells in the first layout to reduce cell overlap.

20 Claims, 15 Drawing Sheets

METHOD, NON-TRANSITORY COMPUTER-READABLE MEDIUM, AND APPARATUS FOR ARRANGING ELECTRICAL COMPONENTS WITHIN A SEMICONDUCTOR DEVICE

BACKGROUND

Under present practice, layout of integrated circuitry (IC) can be simulated using automatic placement and routing (APR) tools. Conventional legalization (one step in the APR process) typically assumes that all cell rows in a design layout are of the same height. Nevertheless, a design layout comprising combined short-row and tall-row heights (i.e., mixed-row heights) can provide a feasible design for performance and area co-optimization in an advanced node. However, the conventional APR process cannot efficiently legalize the design layout with mixed-row height. That is, the mixed-row height design can increase time required to run the entire APR process. Therefore, an improved legalization that can reduce total operating time of the APR process is called for.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

FIGS. 9A-1, 9B-1, 9A-2, 9B-2, 9A-3, 9B-3, 9A-4, 9B-4, and 9C-4 are top views of an IC design layout, in accordance with some embodiments of the present disclosure.

DETAILED DESCRIPTION

Figure 1:
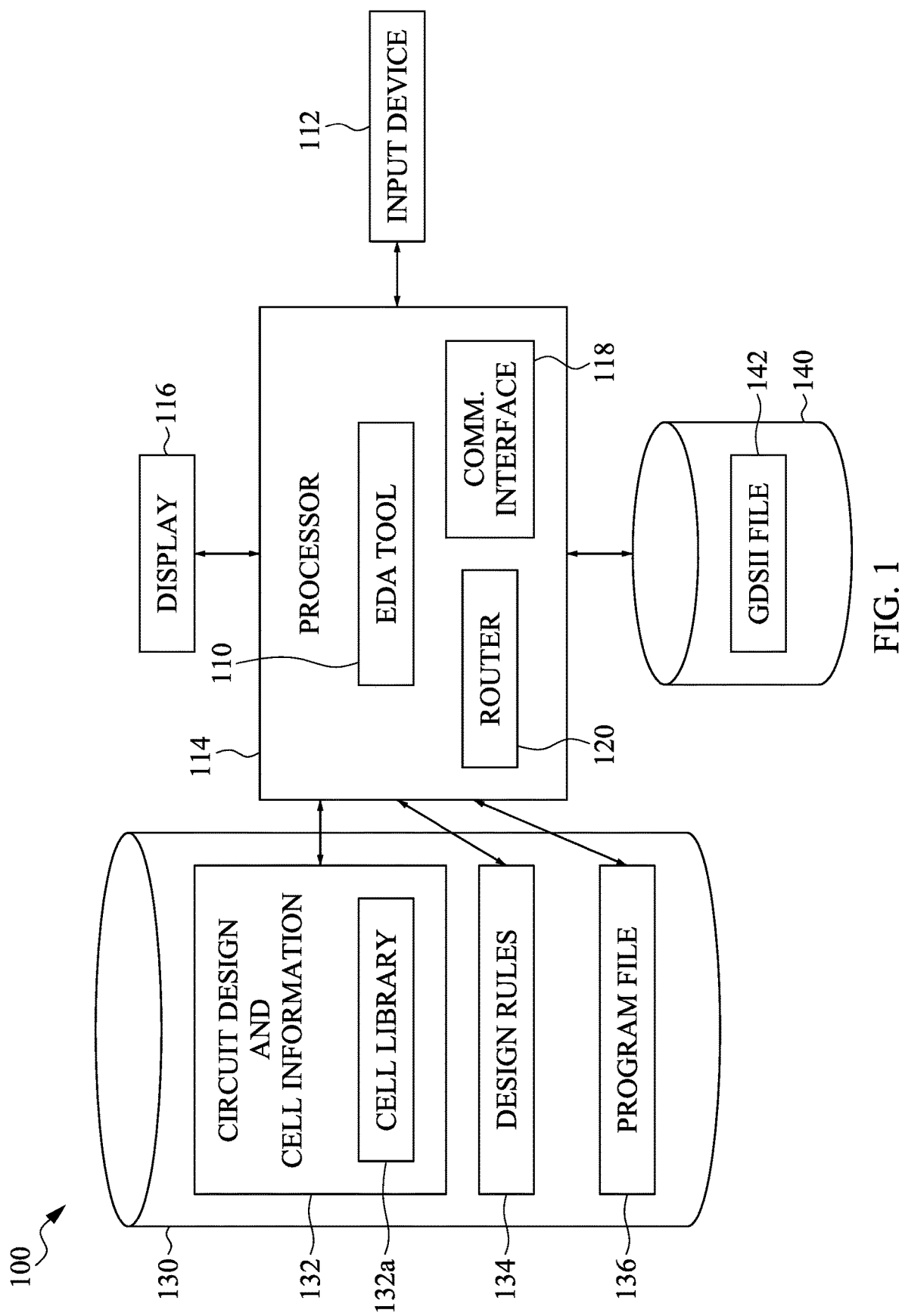
FIG. 1 is a diagram illustrating an electronic design automation system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram illustrating an electronic design automation system 100 in accordance with some embodiments. As shown in FIG. 1, system 100 includes an electronic design automation ("EDA") tool 110 having a place and route tool including a chip assembly router 120.

The FDA tool 110 is a special purpose computer configured to retrieve stored program instructions 136 from a computer readable storage medium 130 and 140 and execute the instructions on a general purpose processor 114. Processor 114 may be any central processing unit ("CPU"), microprocessor, micro-controller, or computational device or circuit for executing instructions. The non-transitory computer readable storage medium 130 and 140 may be a flash memory, random access memory ("RAM"), read only memory ("ROM"), or other storage medium, Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130 and 140 may store data input by a user such as a circuit design and cell information 132, which may include a cell library 132a, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 118 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels. The communications interface 118 may be a wired link and/or a wireless link coupled to a local area network (LAN) or a wide area network (WAN).

Figure 2:
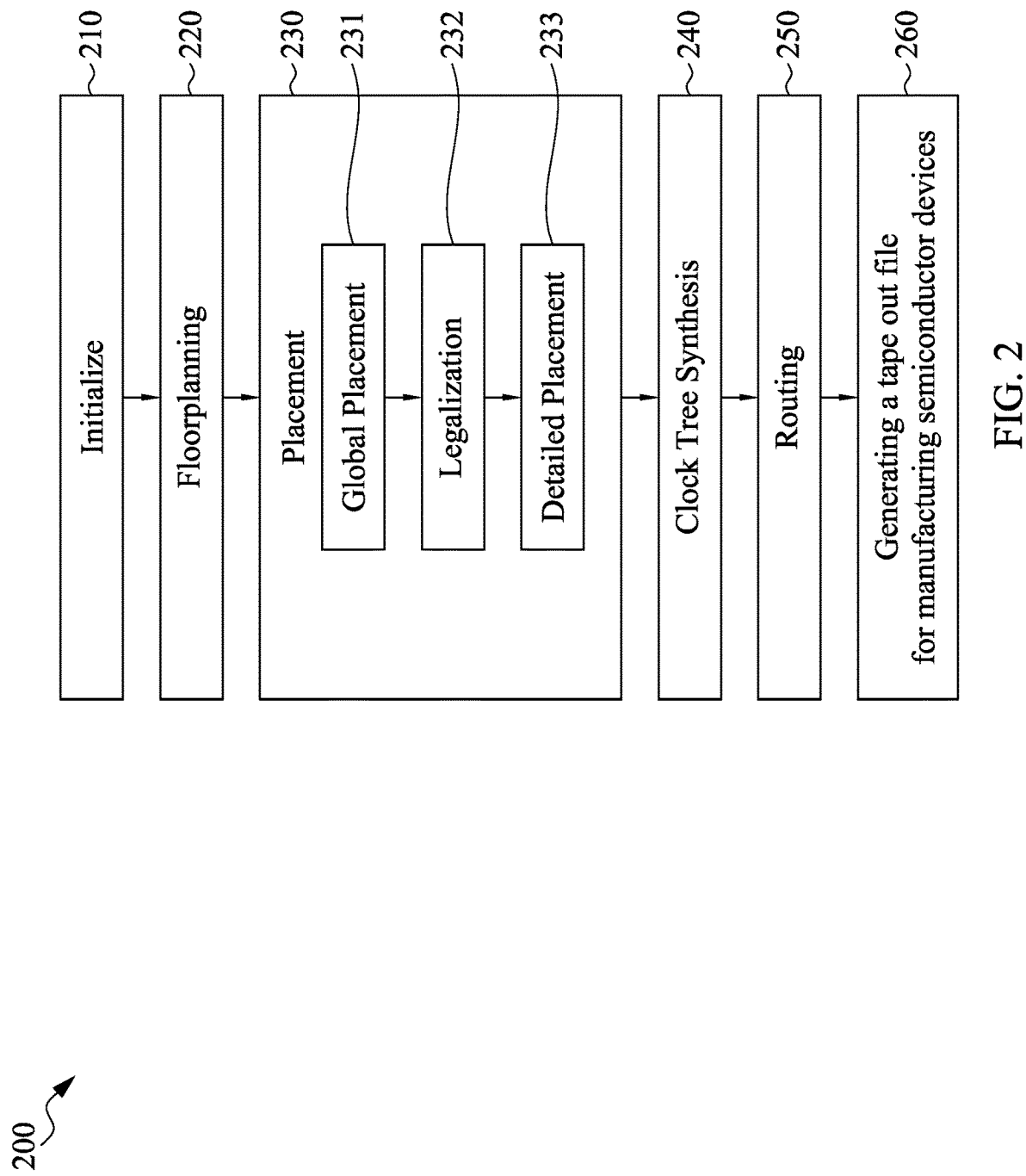
FIG. 2 is a flowchart showing a method for generating an integrated circuit design layout, in accordance with some embodiments of the present disclosure.

Router 120 is capable of receiving an identification of a plurality of cells to be included in a circuit layout, including a list 132 of pairs of cells. The plurality of cells can be connected to each other. In some embodiments, the list 132 can be selected from the cell library 132a. Design rules 134 may be used for a variety of processing technologies. In some embodiments, the design rules 134 configure the router 120 to locate connecting lines and vias on a manufacturing grid. Other embodiments may allow the router to include off-grid connecting lines and/or vias in the layout, FIG. 2 is a flowchart 200 showing a method for generating an integrated circuit design layout, in accordance with some embodiments of the present disclosure. In some embodiments, this method may correspond to an automatic placement and routing (APR) process. In some embodiments, the APR process of the present disclosure may be applied to any suitable integrated circuit design layout.

The APR process shown in FIG. 2 may begin in operation 210, initializing a pre-placement of an integrated circuit design layout. For example, the pre-placement simulation may be generated according to design data corresponding to an integrated circuit layout stored in a data storage device. In some embodiments, the pre-placement simulation may be executed on the design, e.g., by an EDA tool, to determine whether the design meets a predetermined specification. If the design does not meet the predetermined specification, the semiconductor device is redesigned. In some embodiments, a SPICE simulation is performed on the SPICE netlist. Other simulation tools can be employed, in place of or in addition to the SPICE simulation, in other embodiments.

In operation 220, floor planning for the integrated circuit is performed, for example, by system 100. In some embodiments, floor planning includes dividing a circuit into functional blocks, which are portions of the circuit, and identifying the layout for these functional blocks.

In operation 230, an automated placement tool may create a transistor level design by placing cells from a cell library to form the various logic and functional blocks according to the IC design. In some embodiments, the system 100 performs placement for the integrated circuit. In some embodiments, operation 230 includes determining the placement for the electronic components, circuitry, and logic elements. For example, the placement of the transistors, resistors, inductors, logic gates, and other elements of the integrated circuit can be selected in operation 230.

In some embodiments, operation 230 can include sub-operations of global placement 231, legalization 232, and detailed placement 233.

Global placement 231 is a rough placement of the integrated circuit design layout. In some embodiments, global placement 231 may include distributing the cells in the integrated circuit design layout with overlaps. During global placement 231, a placement tool can be used to generate an automatic placement of the cells with approximately regular cell densities while minimizing wire length. Global placement 231 can utilize partitioning-based techniques, simulated annealing-based techniques, analytical placement techniques, or any combination thereof. In some embodiments, the integrated circuit design layout includes cells arranged in rows. In one embodiment, the cell rows in the integrated circuit design layout can be of the same height. In another embodiment, the cell rows in the integrated circuit design layout can be of different heights.

After global placement 231, cells may still overlap and be misaligned with the rows. To remedy the overlap and misalignment, legalization 232 includes removing any remaining overlaps between the cells and aligning all the cells in the integrated circuit design layout. That is, legalization 232 legalizes global placement 231. In other words, legalization 232 places cells at legal placement sites and removes overlaps. Therefore, legalization 232 removes white spaces in the integrated circuit design layout.

Detailed placement 233 further improves wire length (or other problems) by locally rearranging the cells while maintaining legality. That is, the detailed placement 233 provides a final placement based on the legality and wire length.

In operation 240, Clock Tree Synthesis (CTS) may be performed after the placement of cells. In some embodiments, a CTS tool synthesizes a clock tree for the entire integrated circuit design layout. As it does so, the CTS tool establishes only an approximate position for each buffer forming the clock tree and only approximates the routing of signal paths that will link the buffers to one another and to synchronization, so that it can make reasonably accurate estimates of signal path delays through the clock tree.

In operation 250, an automatic routing tool then determines the connections needed between the devices in the cells, such as MOS transistors. Multiple transistors are coupled together to form functional blocks, such as adders, multiplexers, registers, and the like, in the routing step. Routing comprises the placement of signal net wires on a metal layer within placed cells to carry non-power signals between different functional blocks. In some embodiments, signal net wires are routed on the same metal level as one of the vertically adjacent metal layers in the multilevel power rails.

Once the routing is determined, automated layout tools are used to map the cells and the interconnections from the router onto a semiconductor device using the process rules and the design rules, as provided. All of these software tools are available commercially for purchase. Cell libraries that are parameterized for certain semiconductor wafer manufacturing facilities are also available.

In operation 260, a tape out data file corresponding to an integrated circuit layout of a semiconductor device may be generated. In some embodiments, the integrated circuit design layouts can include FinFET devices and/or other planar or more complex structural semiconductor manufacturing processes.

Figure 3:
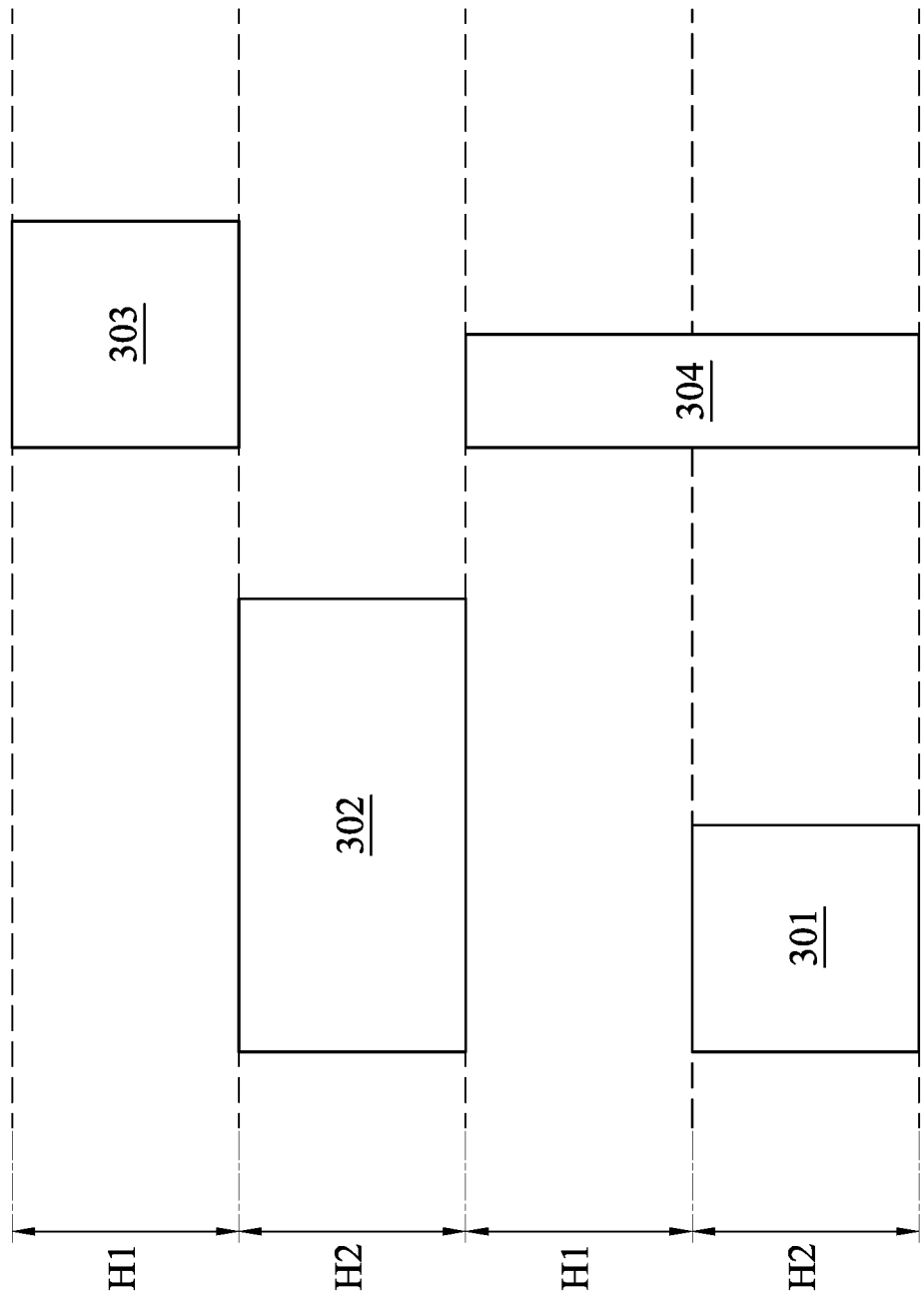
FIG. 3 is a top view of an integrated circuit design layout, in accordance with some embodiments of the present disclosure.

FIG. 3 is a top view of an integrated circuit design layout, in accordance with some embodiments of the present disclosure. The simulated IC design layout in FIG. 3 has row heights H1 and H2. Referring to FIG. 3, the cells 301, 302, 303, and 304 can be provided in the simulated IC design layout.

Row height H1 may be identical to or different from row height H2. For example, the row height H1 can be greater than the row height H2. In some embodiments, the rows of height H1 may be tall-row height and the rows with row height H2 may be short-row height. In some embodiments, the simulated IC design layout can have tall-row and short-row heights alternately arranged.

The cell library includes multiple versions of each cell. For example, the simulated IC design layout may have four cell versions 301, 302, 303, and 304. In some embodiments, the cell 301 is a general standard cell. The cell 301 can have a cell height H2. The cell 301 may be a low-driving cell. The cell 301 can be referred to as a short low-driving (SL) cell version in the present disclosure.

In some embodiments, the cell 302 can be of a height identical to that of cell 301, Cell 302 can be of a different width from cell 301. In one embodiment, the width of the cell 302 can exceed that of the cell 301. For example, the width of the cell 302 can be twice the width of the cell 301. The cell 302 can have a cell height H2. In some embodiments, the cell 302 may be a high-driving cell. The cell 302 can be referred to as a short high-driving (SH) cell version in the present disclosure.

In some embodiments, the cell 303 can be of a width identical to that of the cell 301. The cell 303 can be of a different height from cell 301. In one embodiment, height of cell 303 can exceed that height of the cell 301. The cell 302 can have a cell height H1. For example, the height of the cell 303 can be twice the height of the cell 301. That is, the cell height H1 may be twice the cell height H2. In some embodiments, the cell 303 may be a high-driving cell. The cell 303 can be referred to as a TALL cell version in the present disclosure.

In some embodiments, the cell 304 can be of a width different from that of the cell 301. For example, the width of the cell 304 can be less than that of the cell 301. In some embodiments, the cell 304 can be of a height different from that of the cell 301. In one embodiment, the height of the cell 304 can be greater than the height of the cell 301. In another embodiment, the height of the cell 304 can be greater than the height of the cell 303. That is, the height of the cell 304 can be greater than the cell heights H1 and H2. The cell 304 can have a cell height equal to a sum of the cell height H1 and H2. In some embodiments, the cell 304 may be a high-driving cell. The cell 304 can be referred to as a double-row-height (DR) cell version in the present disclosure.

In one embodiment, a low-driving cell can be converted to any of the cell versions 301, 302, 303, and 304, In another embodiment, a high-driving cell can be converted to any of the cell versions 302, 303, and 304. In some embodiments, the cell versions 301 and 302 may be referred to as the short cell version. The cell version 303 can be referred to as the tall cell version. Cell can be converted according to need. In some embodiments, the IC design layout can include standard cells of short-row height, tall-row height and mixed-row (short and tall rows) height. As the technology evolves, the IC design layout can have multiple cell versions (for example, cell versions 301, 302, 303, and 304) therein for better performance and flexibility.

Figure 4:
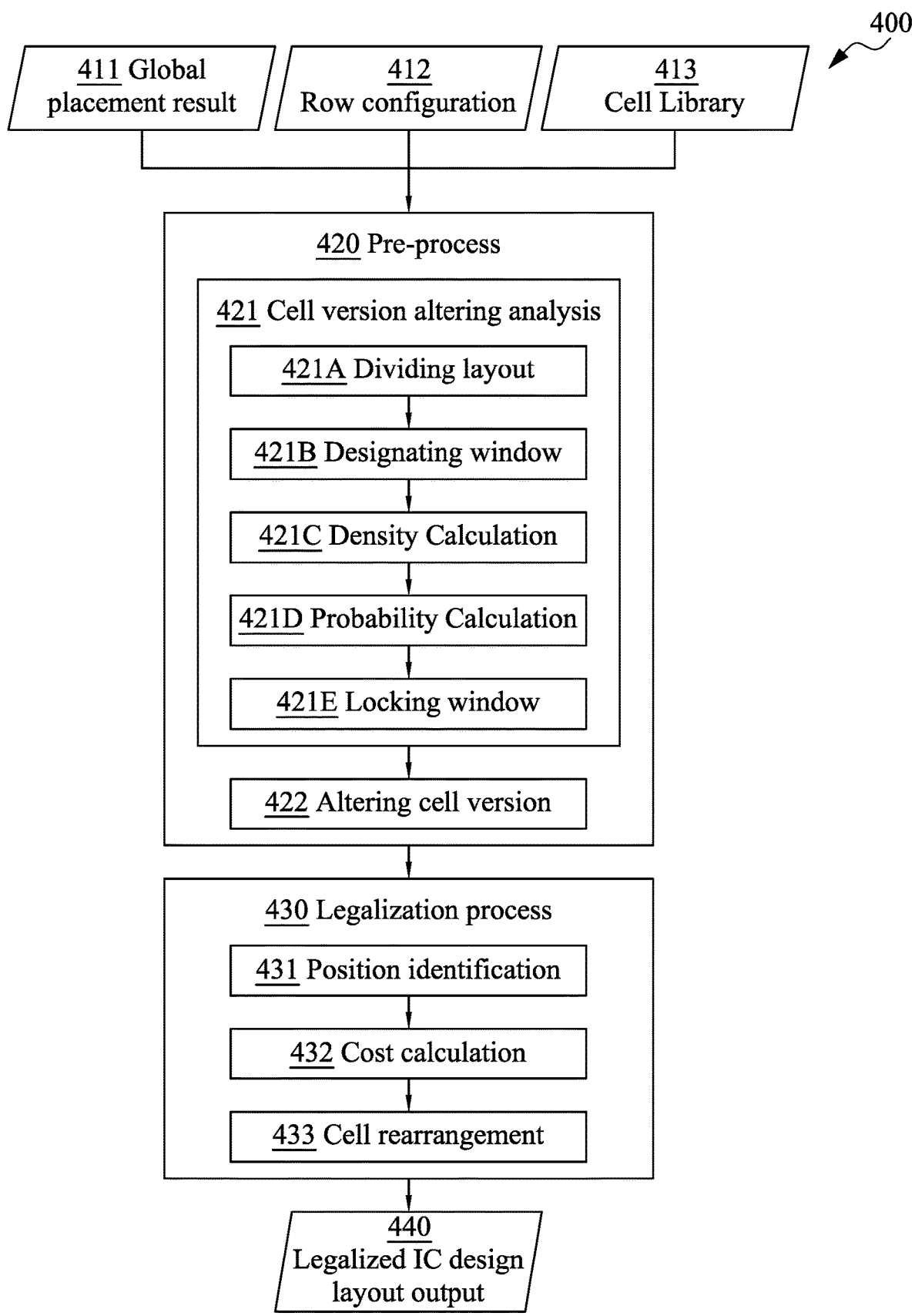
FIG. 4 is a flowchart showing a method for performing a legalization of an integrated circuit design layout, in accordance with some embodiments of the present disclosure.

FIG. 4 is a flowchart 400 showing a method for performing legalization of an integrated circuit design layout, in accordance with some embodiments of the present disclosure. In some embodiments, this method may be a part of the APR process. For example, the details of this method may be a portion of the operation 232 in FIG. 2.

As shown in FIG. 4, the method 400 includes a global placement result 411, a row configuration 412, a cell library 413, a pre-process 420 stage, a legalization process 430 stage, and a legalized IC design layout output 440. The pre-process 420 stage includes operations 421 and 422, wherein operation 421 includes steps 421A, 421B, 4210, 421D, and 421E, The legalization process 430 stage includes operations 431, 432, and 433.

The global placement result 411, the row configuration 412, and the cell library 413 can be provided for legalizing the IC design layout. The pre-process 420 can receive the global placement result 411. In some embodiments, the global placement result 411 can be the result of the operation 231 in FIG. 2. In one embodiment, the global placement result 411 can be unaware of mixed-row height. In another embodiment, the global placement result 411 can be aware of mixed-row height. That is, the subject disclosure provides a legalization capable of legalizing the global placement result aware of or unaware of the mixed-row height. The pre-process 420 can receive the row configuration 412. In some embodiments, the row configuration 412 can include single row height configuration, double row height configuration, or mixed-row height configuration. In some embodiments, the row configuration 412 can include the row height data. The pre-process 420 can receive the cell library 413. In some embodiments, the cell library 413 can be the same as cell library 132a shown in FIG. 1. The cell library 413 can include cell information, such as cell area, cell driving ability, cell version, and other data.

Referring to FIG. 4, the pre-process 420 stage includes operations 421 and 422, wherein operation 421 includes steps 421A, 421B, 421C, 421D, and 421E. In some embodiments, the pre-process 420 can change the cell version of the cells to reduce cell congestion. In some embodiments, the pre-process 420 can reduce cell congestion without rearrangement of cells.

In operation 421, probability of altering cell versions of each cell in the IC design layout is calculated at least based on the global placement result 411. The cell version of cell can be changed to reduce cell congestions in the IC design layout. The probability of altering cell versions of the cells is calculated in operation 421. The cell version of the cells can be altered in operation 422.

Figure 5:
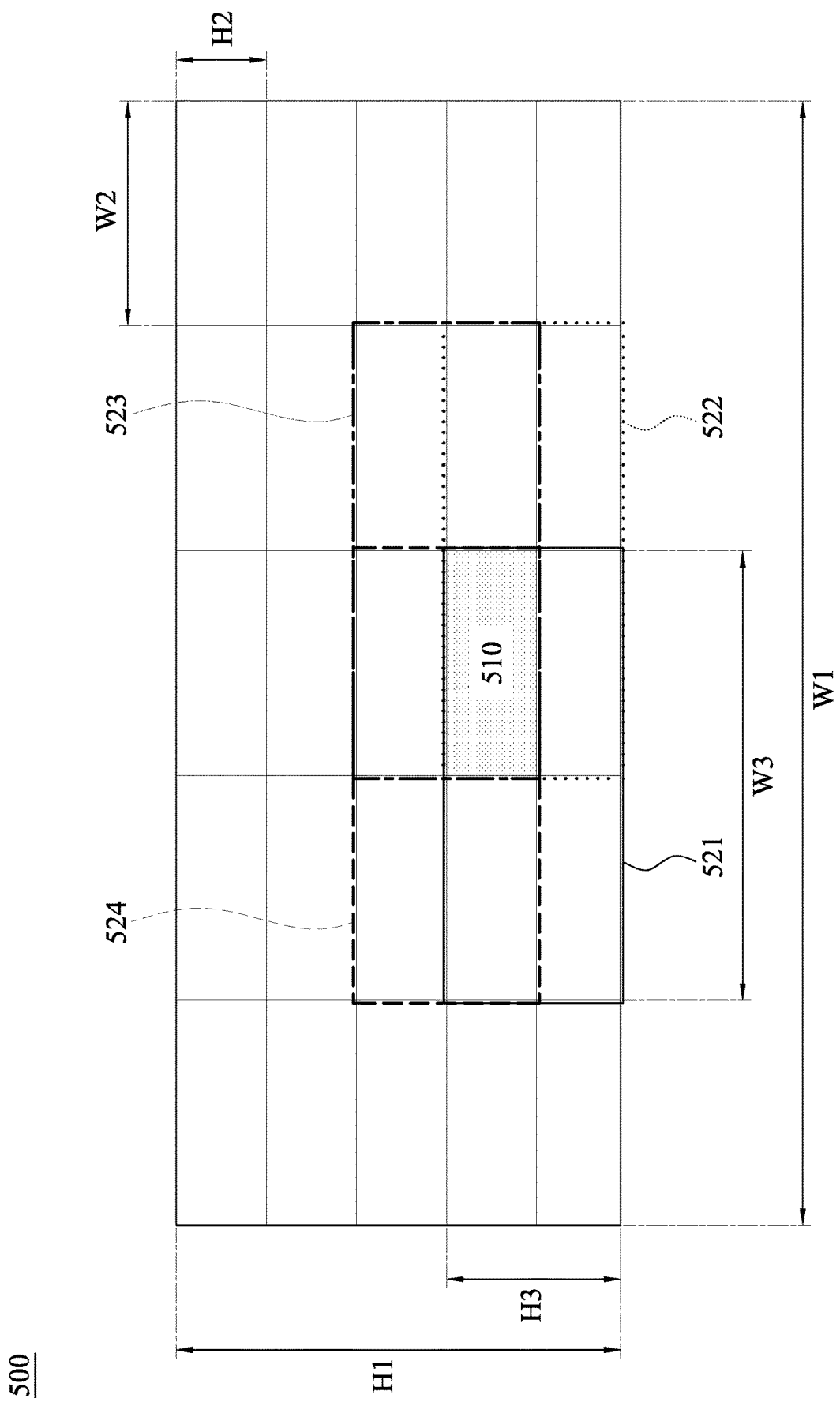
FIG. 5 is a top view of an IC design layout, in accordance with some embodiments of the present disclosure.

In step 421A, the IC design layout can be divided into multiple regions. In some embodiments, each region can include one or more cells. The regions in the IC design layout can be arranged in a matrix. In some embodiments, each region can have a uniform width and a uniform height. The cells in the IC design layout can be assigned to the regions according to the center position thereof. That is, the cells can be assigned to the closest region. In some embodiments, the cells can be assigned to the regions nearest the global placement center position of such cells. For example, an IC design layout 500 as shown in FIG. 5 can be divided into 25 regions. Details of step 421A may be found in the descriptions associated with FIG. 5.

In step 421B, multiple windows can be designated in the IC design layout. The multiple windows can be designated to calculate the probability of altering the cell version of the cells in the IC design layout. In some embodiments, each window can include one or more regions. The regions can be arranged in a matrix in the windows. The windows can overlap with each other. In some embodiments, one region can be included in one or more windows. Details of step 421B may be found in the descriptions associated with FIG. 5.

In step 4210, the density of each region, the density of each window, the priority of each cell for altering cell versions in the region, and the target density can be calculated. In some embodiments, the density of each region can be calculated. The density of the region represents the cell congestion in the region. In some embodiments, the density of each window can be calculated. The density of the window represents the cell congestion in the window. In other words, greater density of the window represents serious cell congestion therein. With both tall cell version density and short cell version density, the situation of the IC design layout can be analyzed accurately.

The density of each region can include the density of the cells having tall cell version. In some embodiments, the density of each region can include the density of the cells having short cell version. In some embodiments, the density of each window can include the density of the cells having tall cell version. In some embodiments, the density of each window can include the density of the cells having short cell version. In some embodiments, a window having the density with a maximum value is selected from the windows including the same region for calculating the probability for the region.

Referring to FIG. 5, the probability of altering cell versions of the cells in the region 510 can be determined based on the density of the windows 521, 522, 523, and 524 including the region 510. The probability of altering cell versions of the cells in such region can be determined based on the window having the greatest density. For example, the window 524 can have the greatest density among the windows 521, 522, 523, and 524 including region 510 as shown in FIG. 5. Details of step 421C may be found in the descriptions associated with FIG. 5.

The target density U can be provided according to design needs to analyze cell congestion. In some embodiments, the target density U can be expressed by Eq. 1 as follows.

$$U=\max(\text{Min}(1.1\times\text{design density}, 0.95), DD) \quad [\text{Eq. 1}],$$

in which U represents the target density of short cell version or tall cell version; design density represents the ideal density according to the design; DD represents the designer-deciding value for setting a proper target density.

According to Eq. 1, the target density U can be the greatest of DD and a value, where such value can be the smallest of the design density times 1.1, and 0.95. That is, the target density can be at least the value of DD. In some embodiments, the value of DD can be 0.8, 0.85, 0.9, or other suitable value. Nevertheless, Eq. 1 is an example to calculate the target density U and is not limited to the interpretation thereof. It can be contemplated that the target density U can be any value according to the design needs.

Figure 6:
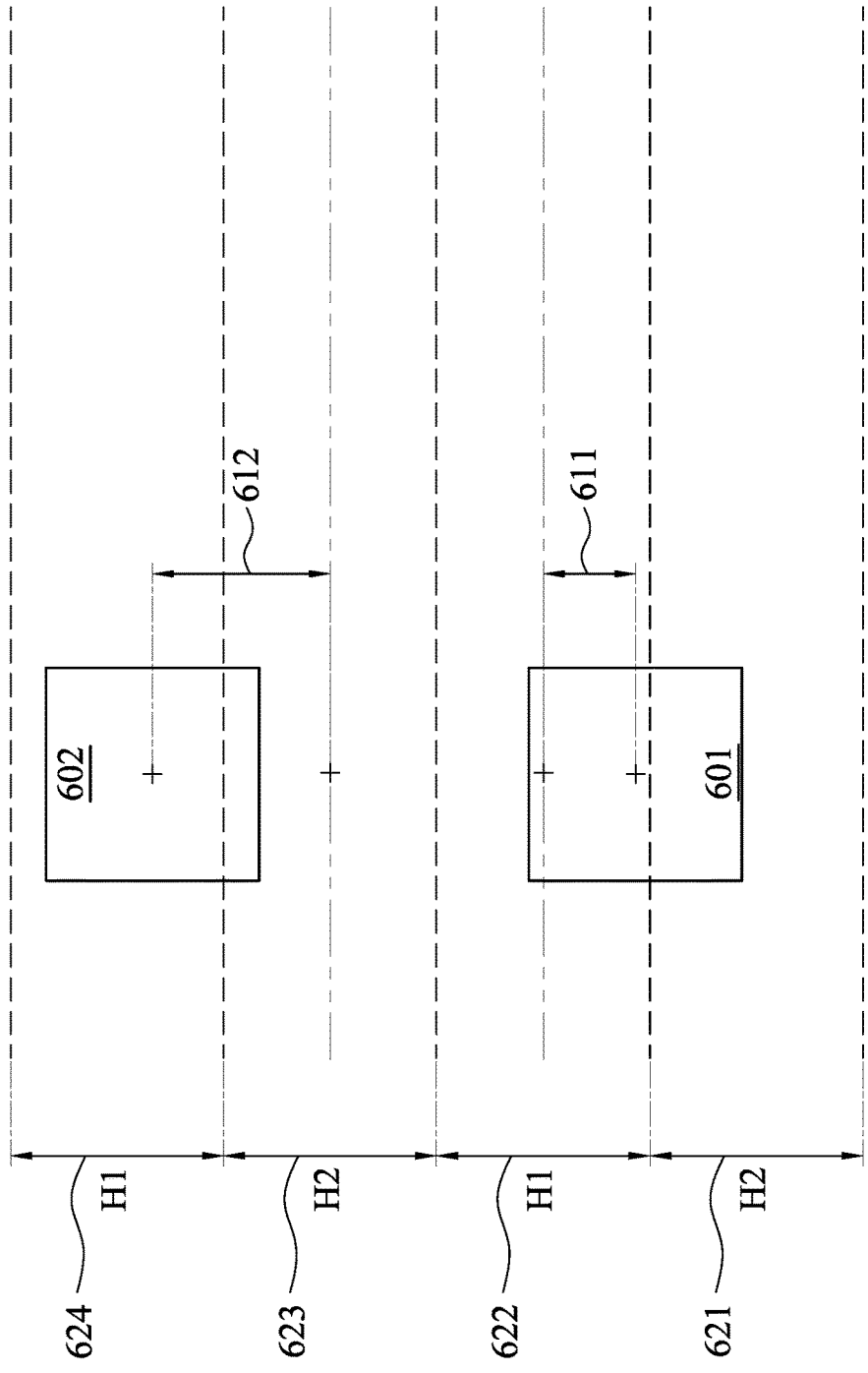
FIG. 6 is a top view of an IC design layout, in accordance with some embodiments of the present disclosure.

The cells in the region can have a priority for altering cell versions. In some embodiments, the priority of cell can include the priority for altering a short cell version to a tall cell version. For example, referring to FIG. 3, the priority can represent the preference of the cell to alter from the cell version 301 (SL cell version) to the cell version 303 (TALL cell version). Referring to FIG. 6, the priority of the cell 601 can be determined by the distance 611 as shown in FIG. 6, where the priority can represent the preference of altering the cell 601 from a short cell version to a tall cell version. In some embodiments, the priority for altering a short cell version to a tall cell version is determined based on the distance between the center position of the cell having a tall cell version and the center position of the nearest tall row.

The priority Priority$_{s2t}$(c) of altering the short cell version to the tall cell version can be expressed by Eq. 2 as follows.

$$\text{Priority}_{s2t}(c)=\text{dis}_{s2t}(c) \quad [\text{Eq. 2}],$$

in which Priority$_{s2t}$(c) represents the priority of altering the short cell version to tall cell version; dis$_{s2t}$(c) represents the distance between the center position of cell having a short cell version and the center position of the nearest tall row.

In some embodiments, the priority of cell can include the priority for altering a tall cell version to a short cell version. For example, referring to FIG. 3, the priority can represent the preference of the cell to alter from the cell version 303 (TALL cell version) to the cell version 302 (SR cell version). Referring to FIG. 6, the priority of the cell 602 can be determined by the distance 612 as shown in FIG. 6, where the priority can represent the preference of altering the cell 602 from a tall cell version to a short cell version. In some embodiments, the priority for altering a tall cell version to a short cell version is calculated based on the distance between the center position of the cell having a tall cell version and the center position of the nearest short row. Detailed description of step 421C may be found in FIG. 6.

The priority Priority$_{t2s}$(c) of altering the tall cell version to the short cell version can be expressed by Eq. 3 as follows.

$$\text{Priority}_{t2s}(c)=\text{dis}_{t2s}(c) \quad [\text{Eq. 3}],$$

in which Priority$_{t2s}$(c) represents the priority of altering the tall cell version to short cell version; dis$_{t2s}$(c) represents the distance between the center position of cell having a tall cell version and the center position of the nearest short row.

The shorter distance between the cell position and the center position of the row indicates that the cell version can be more easily altered. Accordingly, the smaller value of the priority indicates a higher priority for altering cell versions.

In step 421D, a probability of altering cell versions for cells in the region can be calculated. In some embodiments, the probability of altering cell versions can be calculated based on the density of the region and the density of the window having the maximum density. Such region can be included in multiple windows, and the density of the window having the maximum density among those can be identified for evaluating cell congestion. In one embodiment, the probability of altering the tall cell version to the short cell version can be calculated based on the tall cell version density of the region and the maximum tall cell version density of the window including the region. In another embodiment, the probability of altering the short cell version to the tall cell version can be calculated based on the short cell version density of the region and the maximum short cell version density of the window including the region.

The probability of altering the short cell version to the tall cell version can be expressed by Eq. 4 as follows.

$$P_{s2t}(r)=\max\{D_{short}(r)-U, 0\}+\max\{W_{short\_max}(r)-U, 0\} \quad [\text{Eq. 4}],$$

in which P$_{s2t}$(r) represents the probability of altering the short cell version to tall cell version; D$_{short}$(r) represents the short cell version density of the region; U represents the target density of short cell version and tall cell version; $W_{short\_max}(r)$ represents the short density of the window having the maximum density in the windows including such region; r represents the region under calculation.

On the contrary, the probability of altering the tall cell version to the short cell version can be expressed by F5 as follows.

$$P_{t2s}(r)=\max\{D_{tall}(r)-U,0\}+\max\{W_{tall\_max}(r)-U,0\} \quad [\text{Eq. 5}],$$

in which $P_{t2s}(r)$ represents the probability of altering the tall cell version to short cell version; $D_{tall}(r)$ represents the tall cell version density of the region; U represents the target density of short cell version and tall cell version; $W_{tall\_max}(r)$ represents the tall density of the window having the maximum density in the windows including such region; and r represents the region under calculation.

In step 421E, the cells in a window can be constrained from altering cell versions when the density of the window is extremely high. When the short cell version density and the tall cell version density of the window both exceed the target density, and the tall cell version density of the window is less than the short cell version density of the window, such window can be prohibited from altering the cells from tall cell version to short cell version, and such window can be referred to as a locked window. In this case, the probability of altering the tall cell version to short cell version of each region within the locked window is zero.

Similarly, when the short cell version density and the tall cell version density of the window both exceed the target density, and the short cell version density of the window is less than the tall cell version density of the window, such window can be prohibited from altering the cells from short cell version to tall cell version, and such window can be referred to as a locked window. In this case, the probability of altering the short cell version to tall cell version of each region within the locked window is zero.

The cells in the locked window can be left for later steps, such as the legalization process 430, to eliminate the congestion. That is, altering cell versions of the cells in the locked window may be insufficient to eliminate the congestion of the locked window.

In operation 422, cell versions of one or more cells in a region can be altered. In some embodiments, cell versions of one or more cells in the region can be altered according to a comparison between the probability of altering cell versions of such region and the target density. In some embodiments, the operation 422 can be performed according to a Monte-Carlo based algorithm.

The operation 422 can be performed to reduce the total density of the IC design layout X. In some embodiments, the total density of the IC design layout can be derived through all window density in the IC design layout. The total density of the IC design layout can be expressed by Eq. 6 as follows.

$$X=\Sigma_{all\ windows}(\max\{W_{tall}(w)-U,0\}+\max\{W_{short}(w)-U,0\}) \quad [\text{Eq. 6}],$$

in which X represents the total density of the IC design layout; $W_{tall}(w)$ represents the tall cell version density of such window; U represents the target density; $W_{short}(w)$ represents the short density of such window; w represents the windows.

In some embodiments, the total density X can identify cell congestion. The greater total density X indicates more serious congestion. As the cell versions in the IC design layout are altered through the operation 422, cell congestion can be reduced, and thus the total density X can be reduced.

In some embodiments, the operation 422 can be performed according to Algorithm 1 as follows.

```
Algorithm 1:
Input: The set CELLS of all movable cells in the IC design layout. The set REGIONS of all
    regions. The set WINDOWS of all windows.
Output: A chosen cell version for each cell which can reduce local congestion of short row and
    tall row.
1   Compute total density X and set as X_current;
2   do
3       for each window w in WINDOWS do
4           if Locked_2tall(w) then  // Locked_2tall(w) represents the window being prohibited from
5               altering the cells therein from the short cell version to the tall cell version
6               P_s2t(r) =0, ∀ r ∈ w
7       while Σ_r∈REGIONS P_s2t(r)>0 do
8           Select a region r stochastically according to P_s2t;
9           From r, choose a cell c with SL or SH or DH version with the highest Priority_s2t(c);
10          Change c to TALL version;
11          for each window w containing region r do
12              Update P_s2t of each region inside w;
13      for each window w in WINDOWS do
14          if Locked_2short(w) then  // Locked_2short(w) represents the window being prohibited
15              from altering the cells therein from the tall cell version to the short cell version
16              P_t2s(r) =0, ∀ r ∈ w
17      whileΣ_r∈REGIONS P_t2s(r) > 0 do
18          Select a region r stochastically according to P_t2s;
19          From r, choose a cell c with TALL or DH version with the highest Priority_s2t(c);
20          if c is a low-driving cell then
21              Change c to SL version;
22          else
23              Change c to SH version;
24          for each window w containing region r do
25              Update P_t2s of each region inside w;
26      X_previous=X_current;
27      Re-compute X and set it as X_current;
28  while((X_previous-X_current)> Δ) and (X_current!= (0));
```

Referring to the Algorithm 1, before altering the cell versions, it is determined whether the window w is locked from altering cell versions (as described in the step 421E). Once it is determined that window w is not locked, one or more of the cells c of the region r in the window w can alter cell versions based on the probability of the region r and the priority of cell c, until the difference between the previous total density $X_{previous}$ and the current total density $X_{current}$ exceeds the pre-determined threshold A. The previous total density $X_{previous}$ represents the total density of the IC design layout before altering cell version of cell c, and the current total density) $X_{current}$ represents the total density of the IC design layout after altering cell version of cell c. In other words, the process of altering cell versions of the cells c in the region r can be iterated until the condition is satisfied.

Altering the cell versions can enhance cell driving ability with a similar cell area. In addition, altering the cell versions can be utilized in the mixed-row height configuration so that the cells can be placed near the cell position of the global placement. In other words, displacement of the cells can be reduced. Accordingly, the IC design layout can eliminate cell congestion with less cell displacement, such that the total wire length in the semiconductor device can be reduced correspondingly.

Referring back to FIG. 4, the legalization process 430 can be performed on the IC design layout with cell versions of the cells being altered. In some embodiments, the legalization process 430 can rearrange the cells in the simulated IC layout to reduce cell overlap. The legalization process 430 can rearrange the cells to a legal position. In some embodiments, the congestion which cannot be eliminated efficiently by the operation 422, i.e., altering cell versions, may be reduced by the legalization process 430. For example, the congestion in the locked window as described in the step 421E can be reduced by the legalization process 430.

In operation 431, a position of the cells in the IC design layout can be identified. In some embodiments, the position of the cells can be the position along the length of the cell row, where the position may be referred to as x-position. In some embodiments, the position of the cells can be the position along an axis perpendicular to the cell row, where the position may be referred to as y-position.

In operation 432, a cost of placing the cells in rows can be calculated based on the position of the cells. In some embodiments, the cost of placing the cells can be displacement of such cell. The cost of placing the cells may include a total displacement caused by the displacement of such cell, when such cell overlaps with another cell on that row. In some embodiments, the cost of placing the cells to a legal position can be a sum of the displacement of such cell and the total displacement caused by the displacement of such cell. When the displacement of the cell in the row overlaps with another cell, other cells may be rearranged to a legal position, and thus the displacement of those cells may be counted in the cost of placing the cell.

To determine the most suitable row for placing a cell, the cost for placing such cell in each row can be calculated. For example, a first cost of placing a cell in a row closest to the position of such cell, and a second cost of placing such cell in another row secondarily close to the position of such cell. In some embodiments, the first cost and the second cost can include the total displacement caused by the displacement of such cell, if any. Cell can be placed in the row closest to the position thereof when the first cost is less than the second cost. On the contrary, the cell can be placed in the row secondarily close to the position thereof when the second cost is less than the first cost. In some embodiments, the operation 422 can be a row-configuration-aware legalization. That is, the operation 422 can rearrange the cells considering the row height of the row that the cells is locate. The example of cells placing methods may be found in FIGS. 8A-8D. The example of overlap solving may be found in FIGS. 9A-1 to 9C-4.

In operation 433, the cells in the IC design layout can be rearranged in the row having the least cost of displacement. According to the result of the operation 422, the cells can be rearranged based on the costs of placing the cells in each row. After the operation 433, the cells in the IC design layout can be placed in a legal position. In other words, the cells can be placed without overlapping by performing the operation 433.

In operation 440, a legalization result of the IC design layout can be obtained. In some embodiments, the result of the legalization process 430 can have all cells without overlap in the IC design layout. In some embodiments, the result of the legalization process 430 can be the basis on which subsequent operations as shown in FIG. 2 are performed.

FIG. 5 is top view of an IC design layout 500, in accordance with some embodiments of the present disclosure. FIG. 5 shows examples of the IC design layout of steps 421A and 421B in FIG. 4. The IC design layout 500 includes a region 510 and windows 521, 522, 523, and 524.

As described in the step 421A of FIG. 4, the IC design layout 500 can be divided into several regions. In one embodiment, the layout 500 can include 25 regions. The number of regions are not limited, and the IC design layout can be divided into any number of regions according to need. In some embodiments, the layout can have a total height H1 and a total width W1. Each region of the layout 500 can have a height H2 and a width W2. In some embodiments, the regions of the layout 500 can have a uniform height and a uniform width. In some embodiments, each region can include one or more cells.

As described in the step 421B of FIG. 4, the IC design layout can include several windows. In one embodiment, the window can include one or more regions. In some embodiments, the regions can be arranged in a matrix in the window. For example, the window 521 can be a 2×2 matrix, which includes four regions. The matrix size of the window is not limited. For example, the matrix size of the window can be 2×2, 3×3, 4×4, 2×3, or other suitable size according to need. The window 521 can have a height H3 and a width W3. In some embodiments, the windows 522, 523, and 524 can have a size identical to that of the window 521.

The window 521 can partially overlap with the window 522. For example, the right portion of the window 521 can overlap with the window 522. The window 521 can partially overlap with the window 524. For example, the upper portion of the window 521 can overlap with the window 524. In some embodiments, the window 522 can partially overlap with the window 523. For example, the upper portion of the window 522 can overlap with the window 523, in some embodiments, the window 523 can partially overlap with the window 524. For example, the left portion of the window 523 can overlap with the window 524. In some embodiments, the windows 521, 522, 523, and 524 can partially overlap at the region 510. That is, the windows 521, 522, 523, and 524 can include the region 510.

Referring to step 421B, the probability of altering cell versions of the cells in the region 510 can be determined based on the density of the windows 521, 522, 523, and 524 including the region 510. The probability of altering cell versions of the cells in the region 510 can be calculated based on the window having the greatest density. For example, the window 524 may have the greatest density among the windows 521, 522, 523, and 524. Accordingly, the probability of altering cell versions of the cells in the region 510 can be calculated based on the density of the window 524. For example, the probability of the region 510 can be calculated according to Eq. 4 and Eq. 5.

FIG. 6 is top view of an IC design layout 600, in accordance with some embodiments of the present disclosure. The IC design layout 600 can include cells 601 and 602, distances 611 and 612, and rows 621, 622, 623, and 624.

In some embodiments, the IC design layout 600 can include four rows 621, 622, 623, and 624. In one embodiment, the rows 621 and the 623 can have the same row height H2. The rows 622 and 623 can have the same row height 141. In some embodiments, the relationship between the row heights H1 and H2 may refer to the same shown in FIG. 3. That is, the row height H1 can be greater than the row height H2. In some embodiments, the rows 621 and 623 can be the short row. The rows 622 and 624 can be the tall rows. In some embodiments, the layout 600 can include standard cells of short-row height, tall-row height and mixed-row (short and tall rows) height.

Referring to FIG. 6, the cell 601 can be located at the rows 621 and 622. The cell 601 can have a portion located in the row 621 and another located in the row 622. In some embodiments, the center position of the cell 601 can be located on the row 622. In some embodiments, the cell 601 can be the short cell version. For example, the cell 601 can be the cell version 301 in FIG. 3 (SL cell version). The cell 601 can be the cell version 302 in FIG. 3 (SH cell version).

In some embodiments, the cell 601 can have a distance 611 between the center position thereof and the center position of the tall row 622. In some embodiments, the tall row 622 can be the closest row to the cell 601. Referring back to the step 421C in FIG. 4, the priority for altering a short cell version to a tall cell version of the cell 601 can be determined by the distance 611. In one embodiment, the priority of the cell 601 can represent the preference of the cell 601 to alter from a short cell version (for example, SL or SH cell version) to a tall cell version (for example, TALL cell version).

Since the center position of the cell 601 is located on the row 622, the cell 601 may have a higher preference to alter to a tall cell version. On the contrary, placing the cell 601 on the nearest short row, i.e., the row 621, can lead to more displacement than placing it on the tall row, i.e., the row 622. Therefore, the cell 601 may alter to a tall cell version to be placed on the tall row 622 rather than be a short cell version to be placed on the row 621.

The cell 602 can be located at the rows 623 and 624. The cell 602 can have a portion located in the row 623 and another located in the row 624. In some embodiments, the center position of the cell 602 can be located on the row 624. In some embodiments, the cell 602 can be the tall cell version. For example, the cell 602 can be the cell version 303 in FIG. 3 (TALL cell version).

In some embodiments, the cell 602 can have a distance 612 between the center position thereof and the center position of the short row 623. In some embodiments, the row 623 can be the closest short row to the cell 602. Referring back to the step 421C in FIG. 4, the priority for altering a tall cell version to a short cell version of the cell 602 can be determined by the distance 612. In one embodiment, the priority of the cell 602 can represent the preference of the cell 602 to alter from a tall cell version (for example, TALL cell version) to a short cell version (for example, SH cell version).

Since the center position of the cell 602 is located on the row 624, the cell 602 may be more likely to be a short cell version. In some embodiments, placing the cell 602 on the nearest tall row, i.e., the row 624, can lead to less displacement than placing it on the nearest short row, i.e., the row 623. Therefore, the cell 602 may be a tall cell version to be placed on the tall row 624 rather than be a short cell version to be placed on the short row 623.

The shorter distance between the cell position and the center position of the row indicates that the cell is more likely to alter its cell version. Accordingly, the cell having the smaller value of the priority may have a higher priority for altering cell versions.

FIGS. 7A, 7B, 7C, and 7D are top views of an IC design layout, in accordance with some embodiments of the present disclosure. FIGS. 7A-7D show detail of steps 421D in FIG. 4. The layout in FIGS. 7A-7D is divided into several regions. In some embodiments, the layout can include 30*27 regions, i.e., 810 regions. The colored region represents the density thereof greater than a pre-determined threshold. The white region represents the density thereof less than the pre-determined threshold.

Figure 7A:
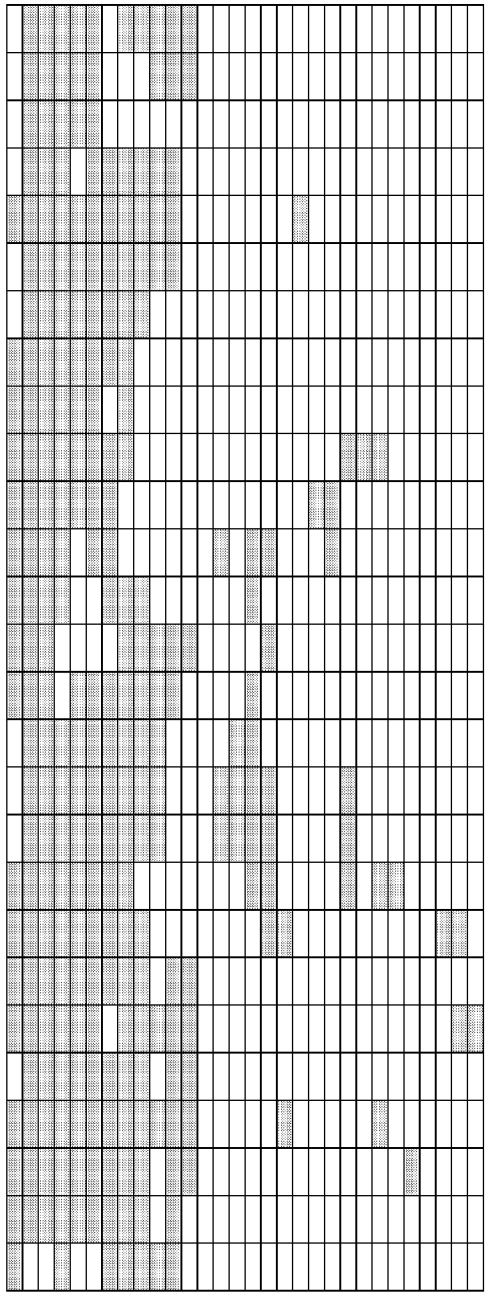
FIGS. 7A, 7B, 7C, and 7D are top views of an IC design layout, in accordance with some embodiments of the present disclosure.
Figure 7B:
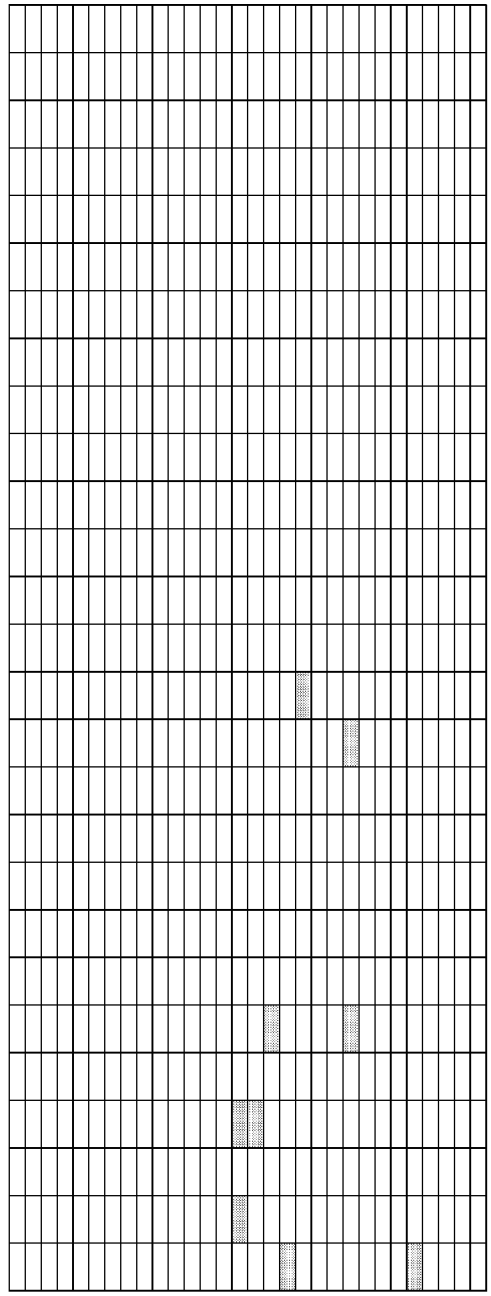

FIG. 7A shows the congestion of the layout based on the density of the short cell version before altering cell versions. FIG. 7B shows the congestion of the layout based on the density of the short cell version after altering cell versions according to the pre-process 420 in FIG. 4. In some embodiments, there may be some regions colored after the pre-process 420 as shown in FIG. 7B, since they can be the locked region for altering from the short cell version to the tall cell version.

Figure 7C:
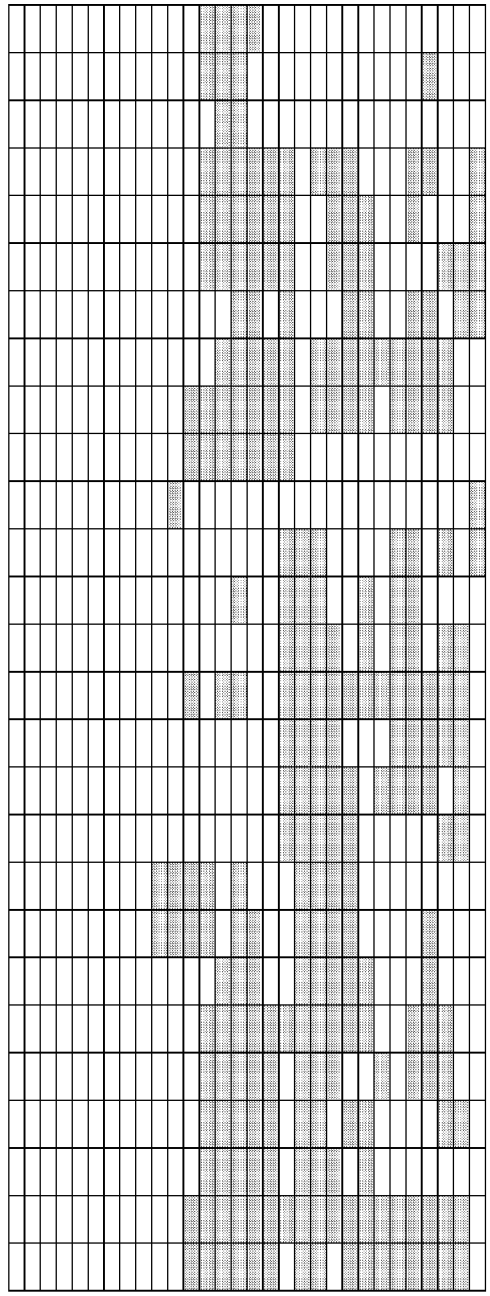
Figure 7D:
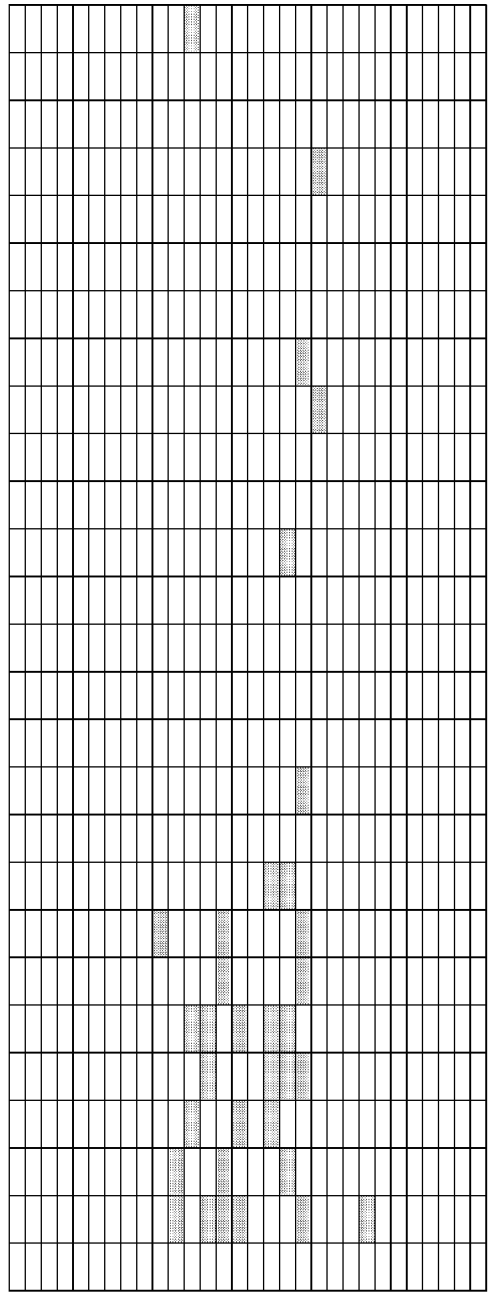

FIG. 7C shows the congestion of the layout based on the density of the tall cell version before altering cell versions. FIG. 7D shows the congestion of the layout based on the density of the tall cell version after altering cell versions according to the pre-process 420 in FIG. 4. In some embodiments, there may be some regions colored after the pre-process 420 as shown in FIG. 7D, since they can be the locked region for altering from the tall cell region to the short cell version.

Figure 8A:
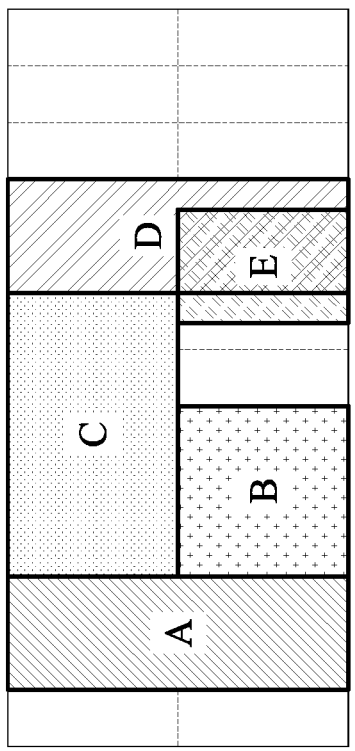
FIGS. 8A, 8B, 8C, and 8D are top views of an IC design layout, in accordance with some embodiments of the present disclosure.
Figure 8B:
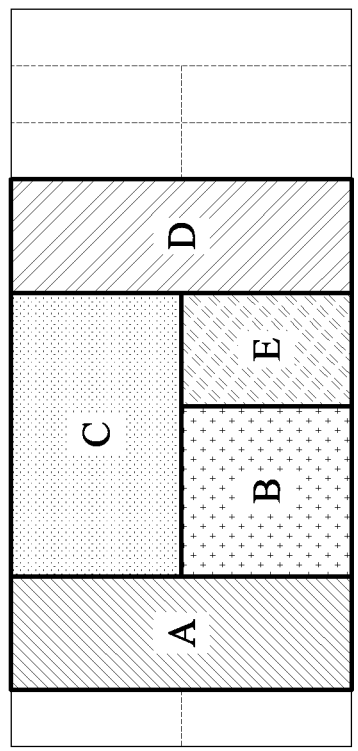
Figure 8C:
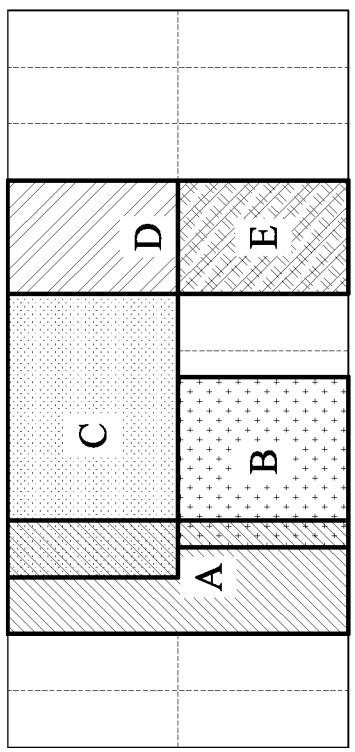
Figure 8D:
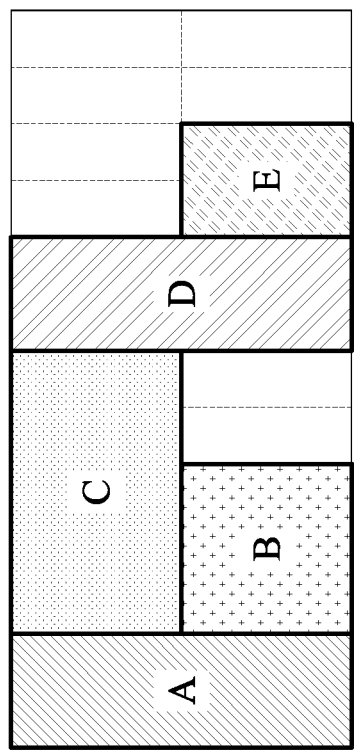

FIGS. 8A, 8B, 8C, and 8D are top views of an IC design layout, in accordance with some embodiments of the present disclosure. FIGS. 8A, 8B, and 8C show steps of a cell placing method in the operation 422 in FIG. 4, while FIGS. 8A, 8B, and 8D show steps of another cell placing method in the operation 422 in FIG. 4.

Referring to FIG. 8A, the layout may include two rows 801 and 802, and five cells A, B, C, D, and E. In some embodiments, the rows 801 and 802 can have the same row height or different row height. That is, the rows 801 and 802 can be both short-row height, both tall-row height, or mixed-row height. In some embodiments, the cells A and D can be located on the rows 801 and 802. The cells B and E can be located on the row 802. Cell C can be located on the row 801. FIG. 8A can be an initial step before the cell placing method has been performed. In some embodiments, the cells A, B, C, D, and E may overlap. For example, cell A can overlap with the cells B and C. Cell C can overlap with cell D. Cell D can overlap with cell E.

Referring to FIG. 8B, the cells A, B, C, and D can be placed in the legal position. In some embodiments, the cells A, B, C, and D can be placed on the grid of the rows 801 and 802.

The cells A, B, C, and D can be placed individually. To eliminate overlap, each cell can be moved to the left adjacent to the nearest cell. Accordingly, cell B can be adjacent to cell A. Cell C can be adjacent to cell A. Cell D can be adjacent to cell C. To be placed in a legal position, the displacement of cell A can be −1 grid. The displacement of cell B can be −0.5 grid. The displacement of cell C can be 0 grid. The displacement of cell D can be +0.5 grid.

As shown in FIG. 8B, cell E overlaps with cell D. Solutions to prevent overlap of cells D and E are shown in FIG. 8C and FIG. 8D.

In FIG. 8C, in some embodiments, cell E is placed on the grid of the row 802. To minimize displacement of cell E, legalized cells A, B, C, and D can be moved to the leftward empty space, making displacement of cell A −2 grid. The displacement of cell B can be −1.5 grid. The displacement of cell C can be −1 grid. The displacement of cell D can be −0.5 grid. In addition, cell E can be moved adjacent to cell D. Accordingly, displacement of cell E can be +1.5 grid.

The movement of cell E as shown in FIG. 8C can have a first cost of displacement. In some embodiments, the first cost includes the total displacement caused by the movement of cell E and the displacement of cell E. The sum of the displacement caused by the movement of cell E can be expressed as $\Delta_1$ as follows.

$$\Delta_1 = (|-2|-|-1|)+(|-1.5|-|0.5|)+(|1|-|0|)+(|0.5|-|-0.5|)$$
$$= 3$$

Accordingly, the first cost can be a sum of the total displacement $\Delta_1$ caused by the movement of cell F and the displacement of cell E. For example, the total displacement $\Delta_1$ can be 3 grid and the displacement of cell E can be 1.5 grid, and thus the first cost can be 4.5 grid.

FIG. 8D shows another solution to eliminate overlap of cells D and E following FIG. 8B. In some embodiments, cell E is placed on the grid of the row 802. To insert cell E in the empty space, first, an empty space on the same row (i.e., the row 802) can be identified from the x-position of cell E toward the left. Second, in some embodiments, it is determined whether the closest empty space is the same size equal or larger, if the empty space is sufficiently large, cell E can be inserted therein. Accordingly, cell E can be inserted in the empty space between the cells B and D on the row 802. In some embodiments, the displacement of cell E can be +1.5 grid.

The movement of cell E as shown in FIG. 8D can have a second cost of displacement. In some embodiments, the second cost includes the total displacement caused by the movement of cell E and the displacement of cell E. Since the movement of cell E does not lead to movement of cells A, B, C, and D, the sum of the displacement caused by the movement of cell E can be zero. Accordingly, the second cost, which is a sum of the total displacement caused by the movement of cell E and the displacement of cell E, can be 1.5 grid, due to the displacement of cell E being 1.5 grid.

In some embodiments, the first cost and the second cost can be compared. According to the comparison between the first cost and the second cost, cell E can be rearranged on the row 802. For example, cell E can be rearranged as shown in FIG. 8D since the second cost is less than the first cost.

Figures 1, 9B:
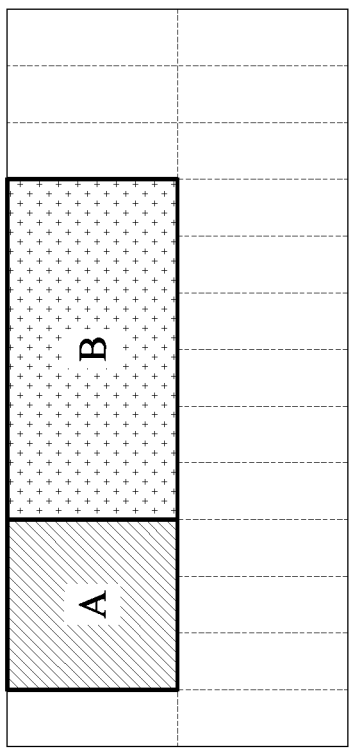
Figures 1, 9A:
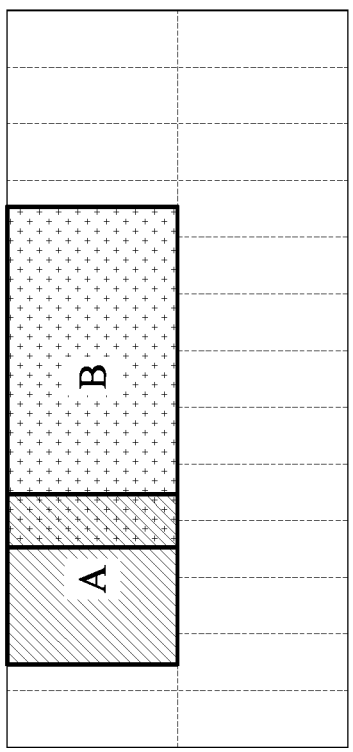
Figures 2, 9A:
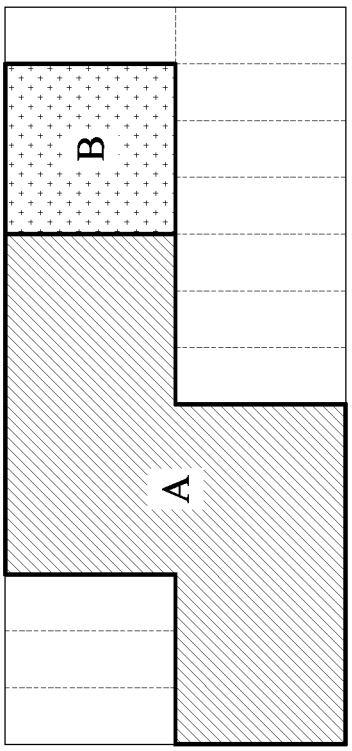
Figures 2, 9B:
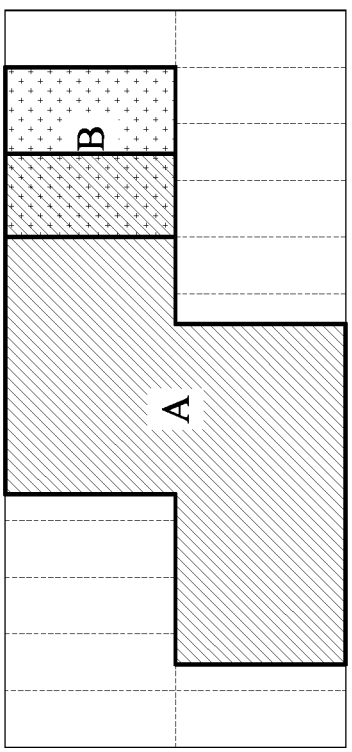
Figures 3, 9B:
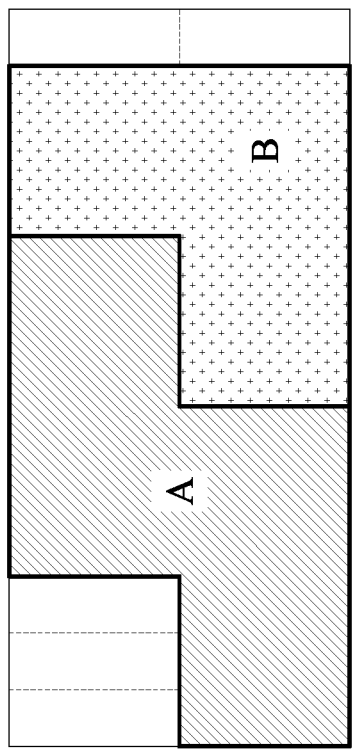
Figures 3, 9A:
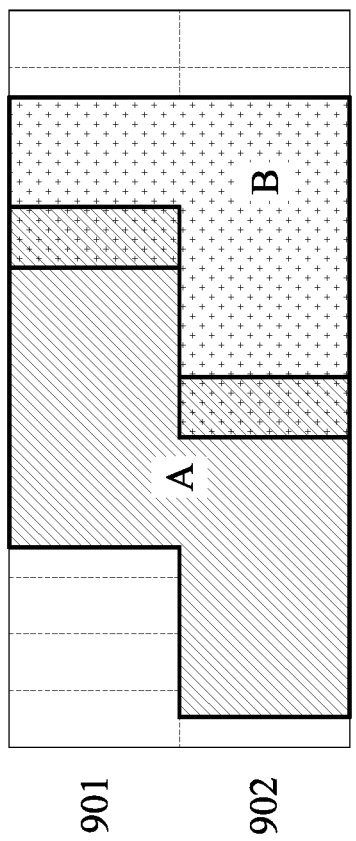
Figures 4, 9A:
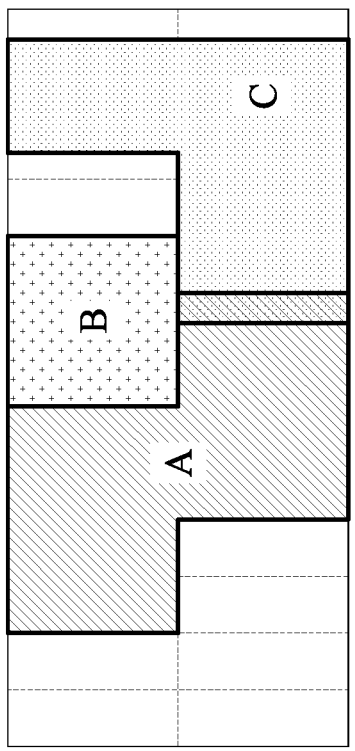
Figures 4, 9B:
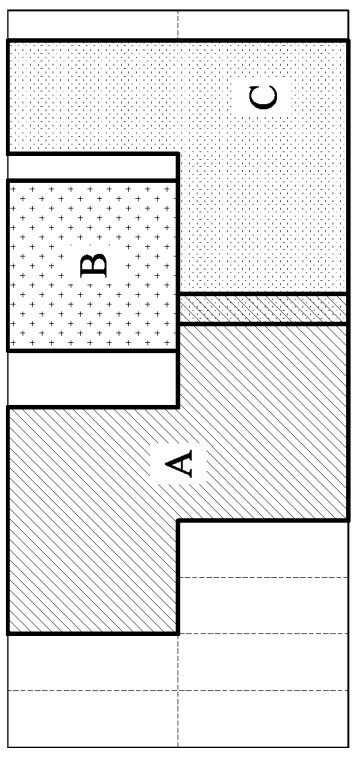

FIGS. 9A-1, 9B-1, 9A-2, 9B-2, 9A-3, 9B-3, 9A-4, 9B-4, and 9C-4 are top views of an IC design layout, in accordance with some embodiments of the present disclosure. FIGS. 9A-1 and 9B-1 show each step of an overlap solution in the operation 422 in FIG. 4. FIGS. 9A-2 and 9B-2 show each step of an overlap solution in the operation 422 in FIG. 4. FIGS. 9A-3 and 9B-3 show each step of an overlap solution in the operation 422 in FIG. 4. FIGS. 9A-4, 9B-4, and 9C-4 show each step of an overlap solution in the operation 422 in FIG. 4.

Referring to FIG. 9A-i, the layout can include rows 901 and 902, and cells A and B. In some embodiments, the rows 901 and 902 can have the same row height or different row height. That is, the rows 901 and 902 can be both short-row height, both tall-row height, or mixed-row height. In some embodiments, the cells A and B can be both located on the row 901. The cells A and B may overlap. FIG. 9A-1 can be an initial step before the overlap solution.

Once cell overlap is resolved, the cells can be combined adjacently into a cluster. In one embodiment, the cells A and B can be referred to as clusters A and B. One cluster can include one or more cells. In some embodiments, the clusters A and B can be both single-row-height clusters, which include only single-row-height cells.

Referring to FIG. 9B-1, the clusters A and B can be placed in a legal position. In some embodiments, the clusters A and B can be placed on the grid of the row 901. To legalize the layout, the cluster A, which is the leftmost cluster, can be placed on the nearest left grid. To eliminate overlap, each cluster is moved to the left adjacent to the nearest cluster. Accordingly, the cluster B can be adjacent to the cluster A. To be placed in a legal position, the displacement of the cluster A can be −0.5 grid. The displacement of cell B can be +0.5 grid. The layout shown in FIG. 9B-1 eliminates overlap of the single-row-height clusters A and B as shown in FIG. 9A-1.

Referring to FIG. 9A-2, the layout can include rows 901 and 902, and clusters A and B. The cluster A can be located on the rows 901 and 902. In other words, the cluster A can be double-row-height, which includes one or more double-row-height cells or combination of the short-row-height cells and the tall-row-height cells. In some embodiments, the cluster B can be located on the row 901. The cluster B can be a single-row-height cluster. The clusters A and B may overlap.

Referring to FIG. 9B-2, the clusters A and B can be placed in a legal position. In some embodiments, the clusters A and B can be placed on the grid of the rows 901 and 902. To legalize the layout, the cluster A, which is the leftmost cluster, can be placed on the nearest left grid. To eliminate overlap, the cluster B can be moved adjacent to the cluster A. To be placed in a legal position, the displacement of the cluster A can be −1.5 grid. The displacement of cell B can be 0 grid. The layout shown in FIG. 9B-2 eliminates the overlap of the double-row-height cluster A and the single-row-height cluster B as shown in FIG. 9A-2.

Referring to FIG. 9A-3, the layout can include rows 901 and 902, and clusters A and B. The clusters A and B can both be located on the rows 901 and 902. In other words, the clusters A and B can both be a double-row-height. In some embodiments, the clusters A and B may overlap.

Referring to FIG. 9B-3, the clusters A and B can be placed in a legal position. In some embodiments, the clusters A and B can be placed on the grid of the rows 901 and 902. To legalize the layout, the cluster A, which is the leftmost cluster, can be placed on the nearest left grid. To eliminate overlap, the cluster B can be moved adjacent to the cluster A. To be placed in a legal position, the displacement of the cluster A can be −0.5 grid. The displacement of cell B can be +0.5 grid. The layout shown in FIG. 9B-3 eliminates the overlap of the double-row-height clusters A and B as shown in FIG. 9A-3.

Referring to FIG. 9A-4, the layout can include rows 901 and 902, and clusters A, B, and C. The clusters A and C can both be located on the rows 901 and 902. In other words, the clusters A and C can both be double-row-height. In one embodiment, the cluster B can be located on the row 901. In other words, the cluster B can be a single-row-height cluster. In some embodiments, the clusters A and C may overlap. The cluster B can be free from overlap with the clusters A and B. In some embodiments, the cluster B can be between the clusters A and C.

Referring to FIG. 9B-4, the clusters A and B can be placed in a legal position. In some embodiments, the clusters A and B can be placed on the grid of the rows 901 and 902. Since the single-row-height cluster B is between the clusters A and C, the single-row-height cluster B can be combined with the left double-row-height cluster A, such that the overlap caused by legalized the double-row-height clusters can be avoided. Therefore, the cluster B can be moved adjacent to the cluster A. As shown in FIG. 9B-4, the displacement of the cluster A can be 0 grid. The displacement of cell B can be +1 grid.

Figures 4, 9C:
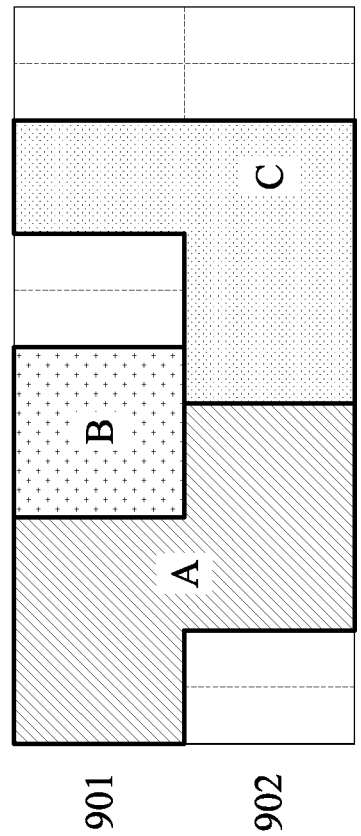

Referring to FIG. 9C-4, the clusters A, B, and C can be placed in a legal position. In some embodiments, the clusters A, B, and C can be placed on the grid of the rows 901 and 902. To legalize the layout, the new cluster A+B, including the clusters A and B, can be moved to the left. To eliminate overlap, the cluster C can be moved adjacent to the cluster A+B. To be placed in a legal position, the displacement of the cluster A+B can be −2 grid. The displacement of cell C can be −1.5 grid. The layout shown in FIG. 9C-4 eliminates the overlap of the double-row-height clusters A and B as shown in FIG. 9A-4.

The layouts provided in FIGS. 9A-1, 9B-1, 9A-2, 9B-2, 9A-3, 9B-3, 9A-4, 9B-4, and 9C-4 are examples of the method for eliminating overlap, and are not limited thereto.

Figure 10:
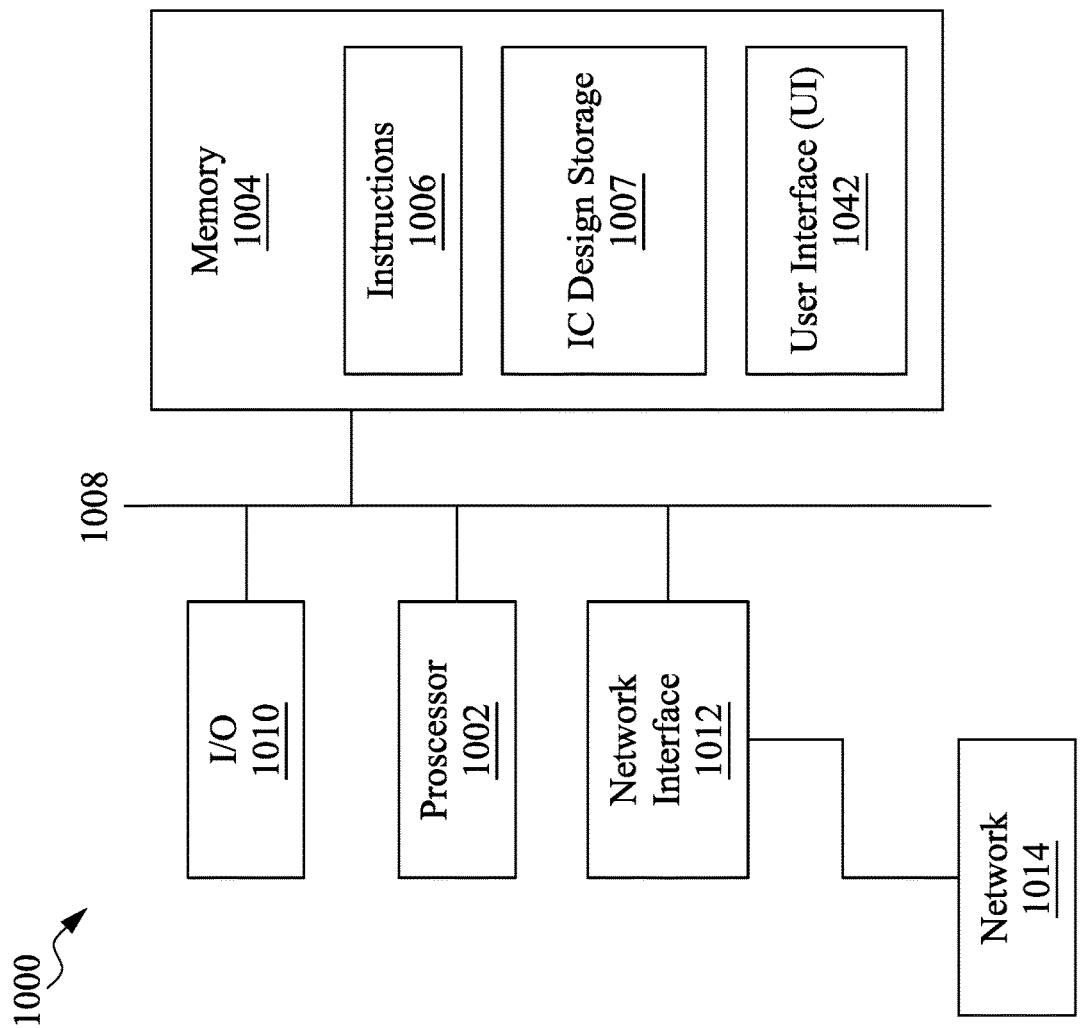
FIG. 10 is a block diagram of an IC layout diagram generation system, in accordance with some embodiments.

FIG. 10 is a block diagram of IC design system 1000, in accordance with some embodiments. Methods described herein of designing IC layout diagrams in accordance with one or more embodiments are implementable, for example, using IC design system 1000, in accordance with some embodiments. In some embodiments, IC design system 1000 can be an APR system, can include an APR system, or can be a part of an APR system, usable for performing an APR method.

In some embodiments, IC design system 1000 includes a processor 1002 and non-transitory, computer-readable memory 1004. Memory 1004, amongst other things, is encoded with, i.e., stores, computer program code, i.e., a set of executable instructions 1006. Execution of instructions 1006 by the processor 1002 represents (at least in part) an EDA tool which implements a portion or all of a method, e.g., a method of generating an IC layout diagram described above (hereinafter, the noted processes and/or methods).

Processor 1002 is electrically coupled to computer-readable memory 1004 via a bus 1008. Processor 1002 is also electrically coupled to an I/O interface 1010 by bus 1008. Network interface 1012 is also electrically connected to processor 1002 via bus 1008. Network interface 1012 is connected to a network 1014, so that processor 1002 and computer-readable memory 1004 are capable of connecting to external elements via network 1014. Processor 1002 is configured to execute instructions 1006 encoded in computer-readable memory 1004 in order to cause IC design system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, memory 1004 is an electronic, magnetic, optical, electromagnetic, infrared, and/or a semiconductor system (or apparatus or device). For example, memory 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, memory 1004 includes a compact disk-read only memory (CD-ROM), a compact disk-read/write (CD-R/W), and/or a digital video disc (DVD).

In one or more embodiments, memory 1004 stores instructions 1006 configured to cause IC design system 1000 (where such execution represents (at least in part) the FDA tool) to be usable for performing a portion or all of the noted processes and/or methods. In one or more embodiments, memory 1004 also stores information which facilitates performing a portion or all of the noted processes and/or methods. In one or more embodiments, memory 1004 includes IC design storage 1007 configured to store one or more IC layout diagrams.

IC design system 1000 includes I/O interface 1010. Interface 1010 is coupled to external circuitry. In one or more embodiments, Interface 1010 includes a keyboard, keypad, mouse, trackball, trackpad, touchscreen, and/or cursor direction keys for communicating information and commands to processor 1002.

IC design system 1000 also includes network interface 1012 coupled to processor 1002. Network interface 1012 allows IC design system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1000.

IC design system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. IC design system 1000 is configured to receive information related to a UI through I/O interface 1010. The information is stored in memory 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1000. In some embodiments, a layout diagram which includes standard cells is generated using a tool such as VIRTUOSO® available from CADENCE. DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, magnetic disk, such as a hard disk, a semiconductor memory, such as a ROM, a RAM, a memory card, and the like.

Figure 11:
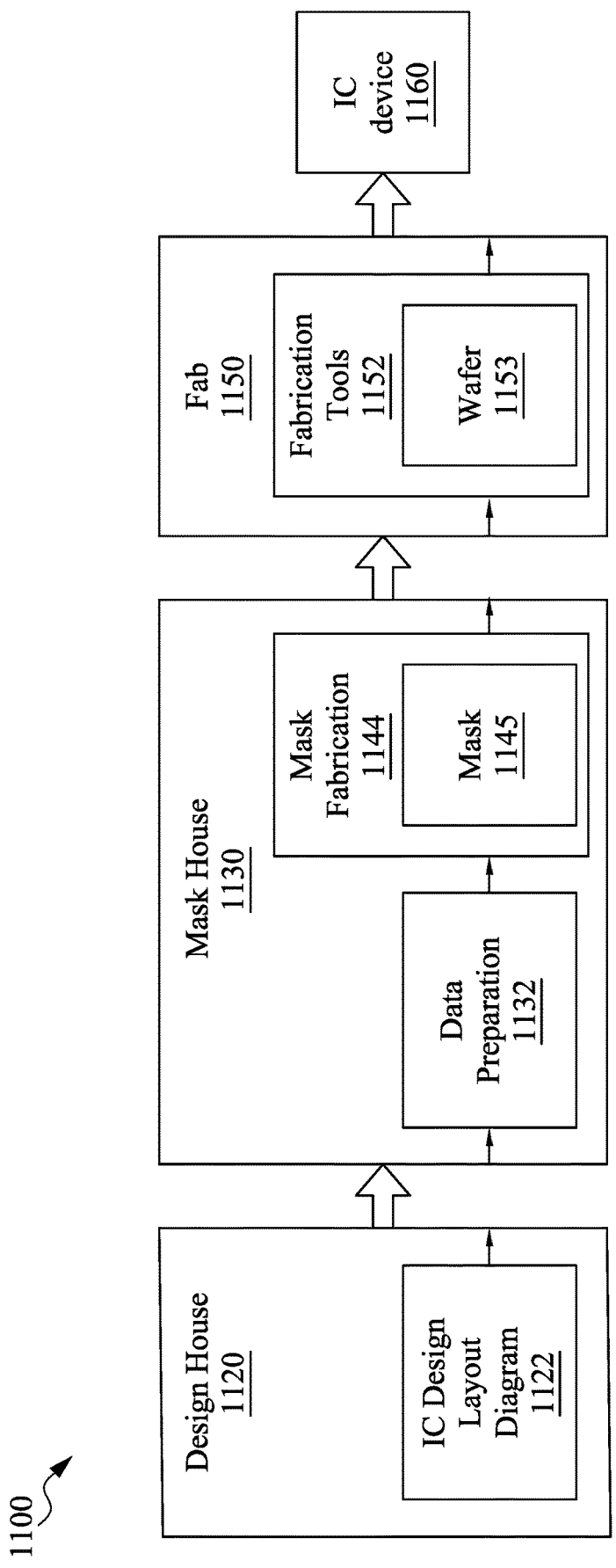
FIG. 11 is a block diagram of an IC manufacturing system, and an IC manufacturing flow associated therewith, in accordance with some embodiments.

FIG. 11 is a block diagram of IC manufacturing system 1100, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns, e.g., an IC layout diagram discussed above. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as mask (reticle) 1145 or a semiconductor wafer 1153. The design layout diagram 1122 is manipulated by mask data preparation 1132 to comply with particular characteristics of the mask writer and/or requirements of IC fab 1150, In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC if the simulated device is not close enough in shape to satisfy design rules, OPC and/or MRC are be repeated to further refine IC design layout diagram 1122.

It should be understood that the description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front-end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes wafer fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a water cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

According to some embodiments, a method for arranging electrical components within a semiconductor device is provided. The method includes (a) placing a plurality of cells in a first layout. The first layout includes a first row and a second row adjacent to the first row, and the first row has a first height different from a second height of the second row, and wherein the plurality of cells each include a first cell version conforming the first row and a second cell version conforming the second row. In addition, the method includes (b) dividing the first layout into a plurality of regions; (c) calculating a first density of each of the plurality of regions; (d) calculating, for a first region of the plurality of regions, a first probability of altering cell versions for cells in the first region according to the first density of the first region; (e) altering cell versions of one or more cells in the first region according to a comparison between the first probability and a first threshold; and (f) rearranging the cells in the first layout to reduce cell overlapping.

According to another embodiment, a non-transitory computer-readable medium is provided. The non-transitory computer-readable medium stores computer-executable instructions executed on a computer system for arranging electrical components within a semiconductor device. The computer-executable instructions includes (a) placing a plurality of cells in a first layout. The first layout includes a first row and a second row adjacent to the first row, and the first row has a first height different from a second height of the second row, and wherein the plurality of cells each include a first cell version conforming the first row and a second cell version conforming the second row. In addition, the computer-executable instructions includes (b) dividing the first layout into a plurality of regions; (c) calculating a first density of each of the plurality of regions; (d) calculating, for a first region of the plurality of regions, a first probability of altering cell versions for cells in the first region according to the first density of the first region; (e) altering cell versions of one or more cells in the first region according to a comparison between the first probability and a first threshold; and (f) rearranging the cells in the first layout to reduce cell overlapping.

According to other embodiments, an apparatus for arranging electrical components within a semiconductor device. The apparatus includes at least one non-transitory computer-readable medium having stored thereon computer-executable instructions; and at least one processor coupled to the at least one non-transitory computer-readable medium. Wherein the computer-executable instructions are executable by the at least one processor and cause the apparatus to (a) place a plurality of cells in a first layout. The first layout includes a first row and a second row adjacent to the first row, and the first row has a first height different from a second height of the second row, and wherein the plurality of cells each include a first cell version conforming the first row and a second cell version conforming the second row. In addition, the computer-executable instructions can be executable by the at least one processor and cause the apparatus to (b) divide the first layout into a plurality of regions; (c) calculate a first density of each of the plurality of regions; (d) calculate, for a first region of the plurality of regions, a first probability of altering cell versions for cells in the first region according to the first density of the first region; (e) alter cell versions of one or more cells in the first region according to a comparison between the first probability and a first threshold; and (f) rearrange the cells in the first layout to reduce cell overlapping.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method for arranging electrical components within a semiconductor device, comprising:
   (a) placing a plurality of cells in a first layout, wherein the first layout includes a first row and a second row adjacent to the first row, and wherein the first row has a first height different from a second height of the second row, and wherein the plurality of cells each include a first cell version conforming the first row and a second cell version conforming the second row;
   (b) dividing the first layout into a plurality of regions;
   (c) calculating a first density of each of the plurality of regions;
   (d) calculating, for a first region of the plurality of regions, a first probability of altering cell versions for cells in the first region according to the first density of the first region;
   (e) altering cell versions of one or more cells in the first region according to a comparison between the first probability and a first threshold; and
   (f) rearranging the cells in the first layout to reduce cell overlap.

2. The method of claim 1, wherein the first height of the first row of the first layout exceeds the second height of the second row of the first layout.

3. The method of claim 1, further comprising:
   designating a plurality of windows, each of the plurality of windows including one or more of the plurality of regions, wherein each of the plurality of windows includes the first region;
   calculating a first density of each of the plurality of windows;
   selecting a first window of the plurality of windows having the first density with a maximum value; and
   calculating a first priority of each cell in the first region for altering cell version.

4. The method of claim 3, wherein the first probability of the first region is calculated based on the first density of the first region and the first density of the first window of the plurality of windows.

5. The method of claim 4, further comprising:
   calculating a second density of each of the plurality of regions;
   calculating a second density of each of the plurality of windows;
   selecting a second window of the plurality of windows having the second density with a maximum value;
   calculating a second priority of each cell in the first region for altering cell version; and
   calculating a second probability of the first region based on the second density of the first region and the second density of the second window of the plurality of windows.

6. The method of claim 5, wherein a third window of the plurality of the windows is prohibited from altering the cells from the first cell version to the second cell version, when the first density and the second density of the third window exceeds a threshold, and the first density of the third window is less than the second density of the third window.

7. The method of claim 5, wherein a fourth window of the plurality of the windows is prohibited from altering the cells from the second cell version to the first cell version, when the first density and the second density of the fourth window exceeds a threshold, and the second density of the fourth window is less than the first density of the fourth window.

8. The method of claim 5, wherein one or more of the cells in the first region alter from the first cell version to the second cell version based on the first probability of the first region and the first priority of the cells, until a first difference between a first total density and a second total density of the first layout exceeds a first pre-determined threshold, wherein the first total density of the first layout is calculated before altering cell versions, and the second total density of the first layout is calculated after altering cell versions.

9. The method of claim 8, wherein one or more of the cells in the first region alter from the second cell version to the first cell version based on the second probability of the first region and the second priority of the cells.

10. The method of claim 3, wherein the regions are arranged in a matrix in each of the plurality of windows.

11. The method of claim 1, wherein the operation (f) includes:
    identifying a first position of a first cell of the cells in the first layout;
    calculating a first cost of placing the first cell in a third row closest to the first position of the first cell;
    calculating a second cost of placing the first cell in a fourth row secondarily close to the first position of the first cell;
    comparing the first cost and the second cost;
    rearranging the first cell in the third row when the first cost is less than the second cost, or rearranging the first cell in the fourth row when the second cost less than the first cost.

12. The method of claim 11, wherein the first cost includes a cost for performing a first movement on the first cell within the third row when the first cell overlaps with another cell on the third row.

13. The method of claim 1, further comprising:
    providing a clock unit in the first layout;
    routing the cells and the clock unit in the first layout; and
    generating a tape out file for manufacturing the semiconductor device according to the first layout.

14. A non-transitory computer-readable medium, storing computer-executable instructions executed on a computer system for arranging electrical components within a semiconductor device, wherein the method comprises:
    (a) placing a plurality of cells in a first layout, wherein the first layout includes a first row and a second row adjacent to the first row, and wherein the first row has a first height different from a second height of the second row, and wherein the plurality of cells each include a first cell version conforming the first row and a second cell version conforming the second row;
    (b) dividing the first layout into a plurality of regions;
    (c) calculating a first density of each of the plurality of regions;
    (d) calculating, for a first region of the plurality of regions, a first probability of altering cell versions for cells in the first region according to the first density of the first region;
    (e) altering cell versions of one or more cells in the first region according to a comparison between the first probability and a first threshold; and
    (f) rearranging the cells in the first layout to reduce cell overlap.

15. The non-transitory computer-readable medium of claim 14, further comprising:
   designating a plurality of windows, each of the plurality of windows including one or more of the plurality of regions, wherein each of the plurality of windows includes the first region;
   calculating a first density of each of the plurality of windows;
   selecting a first window of the plurality of windows having the first density with a maximum value; and
   calculating a first priority of each cell in the first region for altering cell version,
   wherein the first probability of the first region is calculated based on the first density of the first region and the first density of the first window of the plurality of windows.

16. The non-transitory computer-readable medium of claim 15, wherein one or more of the cells in the first region alter from the first cell version to the second cell version based on the first probability of the first region and the first priority of the cells, until a first difference between a first total density and a second total density of the first layout exceeds a first pre-determined threshold, wherein the first total density of the first layout is calculated before altering cell versions, and the second total density of the first layout is calculated after altering cell versions.

17. The non-transitory computer-readable medium of claim 14, wherein the operation (f) includes:
   identifying a first position of a first cell of the cells in the first layout;
   calculating a first cost of placing the first cell in a third row closest to the first position of the first cell;
   calculating a second cost of placing the first cell in a fourth row secondarily close to the first position of the first cell;
   comparing the first cost and the second cost;
   rearranging the first cell in the third row when the first cost is less than the second cost, or rearranging the first cell in the fourth row when the second cost less than the first cost.

18. The non-transitory computer-readable medium of claim 17, wherein the first cost includes a cost for performing a first movement on the first cell within the third row when the first cell overlaps with another cell on the third row.

19. An apparatus for arranging electrical components within a semiconductor device, comprising:
   at least one non-transitory computer-readable medium having stored thereon computer-executable instructions; and
   at least one processor coupled to the at least one non-transitory computer-readable medium, wherein the computer-executable instructions are executable by the at least one processor and cause the apparatus to:
   (a) place a plurality of cells in a first layout, wherein the first layout includes a first row and a second row adjacent to the first row, and wherein the first row has a first height different from a second height of the second row, and wherein the plurality of cells each include a first cell version conforming the first row and a second cell version conforming the second row;
   (b) divide the first layout into a plurality of regions;
   (c) calculate a first density of each of the plurality of regions;
   (d) calculate, for a first region of the plurality of regions, a first probability of altering cell versions for cells in the first region according to the first density of the first region;
   (e) alter cell versions of one or more cells in the first region according to a comparison between the first probability and a first threshold; and
   (f) rearrange the cells in the first layout to reduce cell overlap.

20. The apparatus of claim 19, further comprising:
designating a plurality of windows, each of the plurality of windows including one or more of the plurality of regions, wherein each of the plurality of windows includes the first region;
calculating a first density of each of the plurality of windows;
selecting a first window of the plurality of windows having the first density with a maximum value; and
calculating a first priority of each cell in the first region for altering cell version,
wherein the first probability of the first region is calculated based on the first density of the first region and the first density of the first window of the plurality of windows.

* * * * *